United States Patent Office 3,067,006
Patented Dec. 4, 1962

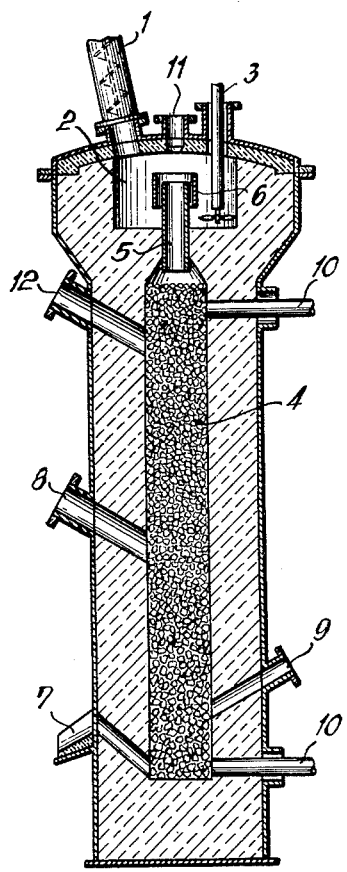

3,067,006
PROCESS AND APPARATUS FOR THE MANUFACTURE OF ANHYDROUS MAGNESIUM CHLORIDE WHICH IS SUBSTANTIALLY FREE FROM MAGNESIUM OXIDE
Hans Ebert, Knapsack, near Koln, Friedbert Ritter, Buschhof, near Konigswinter (Rhine), Ernst Harmsen, Bruhl (Rhine), and Kurt Grapentin, Koln-Zollstock, Germany, assignors to Knapsack-Griesheim Aktiengesellschaft, Knapsack, near Koln, Germany, a corporation of Germany
Filed May 3, 1960, Ser. No. 26,460
Claims priority, application Germany May 5, 1959
4 Claims. (Cl. 23—91)

The present invention is concerned with a process for the manufacture of anhydrous magnesium chloride which is substantially free from magnesium oxide by chlorinating a salt which essentially consists of magnesium chloride and contains about 1–5% by weight water and about 2–6% by weight magnesium oxide. The salt is introduced into a melt of magnesium chloride which travels through a heated chlorination device in which the finely distributed melt trickling down through carbon material is chlorinated with the aid of chlorine, phosgene, a mixture of carbon monoxide and chlorine, a chlorinated hydrocarbon or hydrogen chloride, the hydrogen chloride evolved by hydrolysis when the salt is melted being used in the chlorination. The salt used as starting material may be obtained, for example, by atomization drying or in another appropriate manner. The invention is also concerned with an apparatus suitable for use in the manufacture of magnesium chloride.

It is known that aqueous magnesium chloride solutions and magnesium chloride hydrates can be dried by atomization so as to be converted into products of low magnesium oxide and water content. By this special method of drying, the hydrolysis can be substantially suppressed without a special atmosphere, for example of hydrogen chloride, being required. The powder obtained by atomization drying has very fine grains which are substantially below 15 microns. Depending on the quality of the powder used, a melt containing about 5–15% MgO is obtained.

In a known process, magnesium is produced by subjecting magnesium chloride to electrolysis. In this process, the melt containing magnesium oxide is directly introduced into the apparatus used to carry out the electrolysis. It is, however, more advantageous especially from an economical point of view to use in the electrolytic bath magnesium chloride which is completely free from water and oxide.

The magnesium oxide contained in magnesium chloride can be chlorinated and the residual water eliminated in the solid state by treating the salt powder, which contains about 1–5% $H_2O$ and 2–6% MgO, at a raised temperature but below its melting point, for example with hydrogen chloride, chlorine and carbon, phosgene, a mixture of carbon monoxide and chlorine or a chlorinated hydrocarbon.

This process needs great amounts of chlorine and involves considerable losses of substance due to the fineness of the salt powder. Moreover, the reaction of, for example, magnesium oxide and hydrogen chloride proceeds very reluctantly.

It would therefore be more advantageous in the atomization drying to dehydrate up to one hydrate of magnesium chloride with 1 or 2 mols water of hydration, whereby practically no magnesium oxide is formed and then to dehydrate said hydrate under a hydrogen chloride atmosphere. The dehydration may take place in a shelved drier, a rotary kiln, a fluidized bed or by causing the powder in finely divided form to trickle down in a tower in counter-current to hydrogen chloride gas, but all these processes involve the aforesaid disadvantages. Further difficulties arise during the admission of the required heat energy. The fineness of the powder implies an extremely great hygroscopicity and losses of substance since the fine particles are entrained by a moving gas atmosphere.

It is therefore necessary that the salt powder dried by atomization is melted without coming into contact with the outer atmosphere and the magnesium oxide contained in the melt is then chlorinated. When the salt powder is melted, it is found that the water in the powder substantially undergoes reaction with magnesium chloride, hydrogen chloride being evolved. The hydrogen chloride evolved entrains a part of the powder to be introduced so that losses of substance in the order of 10–30% cannot be avoided.

The process of this invention is carried out as follows with the use of an apparatus as shown diagrammatically (longitudinal section) in the accompanying drawing.

The salt is continuously introduced via charging device 1 into, for example, an electrically heated melting bath 2 which consists of molten magnesium chloride and is hermetically closed with respect to the outside. In order to avoid that magnesium oxide contained in the magnesium chloride deposits and in order to fairly rapidly melt the powder and to achieve a rapid heat exchange between the powder introduced and the melt, the latter is vigorously agitated by means of stirrer 3. The melt container is equipped with an overflow 5 in order to uniformly introduce the melt into chlorinator 4, i.e. into a column of lump coal which is electrically heated by means of electrodes 10. Overflow 5 is series-connected to an apron 6 which prevents unmolten powder from being entrained into overflow 5 to there give rise to obstructions. Chlorine is introduced through inlet 9 into chlorinator 4 in which the melt trickling down and the magnesium oxide it contains are chlorinated in counter-current. In order to avoid local cooling in chlorinator 4 at the level of chlorine inlet 9, the chlorine is pre-heated to the temperature which prevails in said chlorinator. The carbon material, which is consumed during the chlorination, can be supplied continuously to chlorinator 4 through inlet opening 11 and through the opening of overflow 5 or through another orifice. It is advantageous to introduce the melt containing magnesium oxide into the chlorinator from a central place through one or more overflows in order to ensure that the melt on trickling down is fairly well distributed on the lump coal. The absolutely anhydrous melt of which the oxide content amounts to at most 0.1–0.2% magnesium oxide is collected in the lower part of chlorinator 4. It may be removed in discontinuous manner or, and this is more advantageous from an economical point of view, in continuous manner through outlet 7.

The hydrogen chloride which evolves when the salt is melted is introduced together with the melt through overflow 5 into chlorinator 4 and is removed through off-gas outlet 12 together with the off-gas emanating from the chlorinator. The off-gas consists of carbon monoxide, carbon dioxide and a little unreacted chlorine in excess. The hydrogen chloride may be recovered from the off-gas and re-introduced together with chlorine through chlorine inlet 9 into the chlorinator and used for chlorinating the salt melt in counter-current.

Alternatively, the hydrogen chloride may be used for chlorination in that the off-gases of chlorinator 4 are removed through short outlet pipe 8. In this manner, the hydrogen chloride which evolves when the salt is melted is conducted in co-current with the melt in the upper part of chlorinator 4, whereby the magnesium oxide contained in said melt is partially chlorinated. The residual magnesium oxide is chlorinated in the lower part of chlorinator 4 by the chlorine flowing in counter-current. In this embodiment of the invention, a part of the chlorine is introduced into chlorinator 4 from above, for example, through inlet opening 11 or another opening disposed in melting bath 2 in order to avoid the formation of obstructions due to magnesium oxide in the upper part of chlorinator 4. When hydrogen chloride is used for chlorination, the off-gases also contain hydrogen.

A charcoal filter heated for a short time to a temperature above the melting point of the salt should advantageously be disposed in the off-gas outlet 12 of the chlorinator so that escaping magnesium chloride vapors can be condensed.

It is known that magnesium chloride melts or melts of salt mixtures containing magnesium chloride, which melts contain magnesium in the form of its oxide or carbonate, can be treated with gaseous hydrogen chloride or phosgene or chlorine and carbon monoxide. During this treatment, the melt is allowed to trickle down in an electrically heated trickling tower charged with lump coke, which simultaneously serves as electrical resistance for the electric current, and the reaction gases evolved in the trickling tower are conducted in upward direction.

It is also known that the gases, such as chlorine or hydrogen chloride, which flow in coutner-current to the salt melt, can be cycled. In this process, means are disposed which serve to remove the water.

All these known measures are partially employed in the process of this invention. They constitute, however, partial steps which are combined with novel steps to result in a valuable new process.

The process of this invention for the manufacture of anhydrous magnesium chloride substantially free from magnesium oxide by chlorinating a salt which consists essentially of magnesium chloride containing from about 1–5% by weight water and from about 2–6% by weight magnesium oxide, the salt being introduced into a magnesium chloride melt that is conveyed to a heated chlorinator, in which the finely distributed melt trickling down over carbon material is chlorinated with the aid of chlorine, phosgene, a mixture of carbon monoxide and chlorine, a chlorinated hydrocarbon or hydrogen chloride, the hydrogen chloride evolved by hydrolysis when the salt is melted being used as additional chlorinating agent, comprises introducing the magnesium chloride melt into a closed melting bath, advantageously disposed at a position above the chlorinator, intensely stirring said melt in said melting bath, introducing said melt in finely distributed form through a central overflow into the head of the chlorinator, unmolten salt being removed at a position between the overflow and the melting bath, whereby unmolten salt is prevented from being entrained, and discharging an anhydrous magnesium chloride melt which is substantially free from magnesium oxide at the bottom of the chlorinator.

The chlorinating gas which is used in counter-current is preheated to a temperature of about 750° C.–900° C., i.e. the working temperature of the chlorinator. The off-gas escaping from the chlorinator may advantageously be freed from magnesium chloride vapors by being passed through a heated charcoal filter which so to speak has the function of a reflux condenser.

The hydrogen chloride contained in the off-gas is again used for chlorinating the melt. The hydrogen chloride which evolves in the melting bath during the reaction of magnesium chloride with the water contained in the salt powder, can be recovered from the off-gas and used for chlorinating the melt. If the off-gas is removed at a position approximately in the middle section of the chlorinator, the hydrogen chloride evolved during the reaction flows, if desired after admixture of a part of the total amount of chlorine to be used, from the upper part of the chlorinator in co-current with the melt to the bottom of said chlorinator and is thus used for chlorination.

The apparatus used in carrying out the process of this invention comprises a chlorinating tower 4, a melting bath 2 disposed at the upper end of said tower, a charging device 1 through which the salt mixture to be chlorinated is supplied, a stirrer 3, a central overflow 5, an apron 6 disposed between the melting bath 2 and overflow 5, a lower outlet 7, gas inlet pipes 9 and 11, gas outlet pipes 8 and 12 and a column packed with carbon material, said column being disposed between the melting bath 2 and outlet 7 and being heated by electrodes 10. The outlet disposed at the bottom of the chlorinator may be designed as overflow.

The following examples serve to illustrate the invention, but they are not intended to limit it thereto:

*Example 1*

In continuous operation, 130 kg./h. salt containing 1.7% $H_2O$, 3.5% MgO, 7% $MgSO_4$, 2% KCl, 2.5% NaCl and $MgCl_2$ (remainder) were introduced into melting bath 2. A magnesium chloride melt which was intensely stirred by stirrer 3 had previously been introduced into the completely closed melting bath 2 so that the salt supplied by charging device 1 was rapidly melted and deposition of magnesium oxide was avoided. The melt had a temperature of between 750° C. and 900° C. The melt was introduced through overflow 5 into chlorinator 4 and travelled to the electrically heated coke column through which chlorine introduced via chlorine inlet 9 was passed in counter-current to the melt. In the lower part of chlorinator 4 an anhydrous and sulfate-free melt which contained less than 0.1% MgO and about 95% $MgCl_2$ (remainder: alkali metal chlorides) was removed at 750° C.–850° C. by means of outlet 7.

The off-gases which consisted of HCl, CO, $CO_2$ and small amounts of $Cl_2$ and $SO_2$ were removed in the upper part of chlorinator 4 by means of off-gas outlet 12.

*Example 2*

The melting bath was charged in the manner described in Example 1 per hour with 110 kg. salt containing 4.3% $H_2O$, 5.6% MgO, 6% $MgSO_4$, 2% KCl, 2% NaCl (remainder: $MgCl_2$). The melt which was intensely stirred in the melting bath 2 had a temperature of 800°–900° C.

The melt was introduced through overflow 5 into chlorinator 4 where it was chlorinated in counter-current with chlorine. An anhydrous and sulfate-free melt which contained 0.1% MgO and about 95.5% $MgCl_2$ (remainder: alkali metal chlorides) was removed at 750° C.–850° C. through outlet 7. The off-gases were removed through gas outlet 12.

We claim:

1. In the process for the manufacture of anhydrous magnesium chloride substantially free from magnesium oxide by chlorinating a salt which consists essentially of magnesium chloride containing from about 1–5% by weight water and from about 2–6% by weight magnesium oxide, the salt being introduced into a magnesium chloride melt that is conveyed to a heated chlorinator in which the finely distributed melt trickling down over carbonaceous material is chlorinated with the aid of at least one substance selected from the group consisting of chlorine, phosgene, a mixture of carbon monoxide and chlorine, a chlorinated hydrocarbon and hydrogen chloride, the hydrogen chloride evolved by hydrolysis when the salt is melted being used as additional chlorinating agent, the improvement which comprises introducing the magnesium chloride melt into a closed melting bath disposed at a position above the chlorinator, intensely stirring said melt in said melting bath, introducing said melt continuously and steadily through a central overflow into the head of said chlorinator, intercepting any unmolten salt to prevent the same from being entrained as the melt is introduced into said chlorinator, and discharging an anhydrous magnesium chloride melt which is substantially free from magnesium oxide at the bottom of said chlorinator.

2. The process of claim 1, wherein the off-gas escaping from the chlorinator is freed from magnesium chloride vapors by passing the gas through a charcoal filter heated to a temperature above the melting point of magnesium chloride.

3. The process of claim 1, wherein the off-gas is removed at a position approximately in the middle section of the chlorinator and the hydrogen chloride evolved is used in co-current for chlorinating the melt which trickles down in the chlorinator.

4. An apparatus for the manufacture of anhydrous magnesium chloride which is substantially free from magnesium oxide, comprising a chlorination tower, a closed melting bath disposed at the upper end of said tower, a charging device leading into said closed bath through which the salt mixture to be chlorinated is supplied, a stirrer extending into said bath, a central overflow for said bath, a gas inlet pipe leading into the top of the melting bath, an apron disposed between the melting bath and the overflow, a column within said tower packed with carbonaceous material, said column being disposed between the melting bath and an outlet for removing the final product at the lower end of the tower, electrodes connected with said column for heating the carbonaceous material, a gas outlet pipe at the middle of said column, another gas outlet pipe at the upper part of the column and a gas inlet pipe at the lower end of the column.

References Cited in the file of this patent

UNITED STATES PATENTS

| 579,039 | Brashear | Mar. 16, 1897 |
| 1,549,812 | Siedler | Aug. 18, 1925 |
| 1,702,301 | Jaeger et al. | Feb. 19, 1929 |
| 1,999,179 | Burgess | Apr. 30, 1935 |
| 2,355,367 | Cooper | Aug. 8, 1944 |

OTHER REFERENCES

Serebryakova et al., "Chemical Abstracts," vol. 52, No. 17, pages 14992–3 (Sept. 10, 1958).